United States Patent Office 2,862,203
Patented Nov. 25, 1958

2,862,203
ARRANGEMENT IN A RADAR STATION

Sven Christer Skaraeus and Bengt Gustav Oskar Svensson, Bromma, Sweden, assignors to International Standard Electric Corporation, New York, N. Y., a corporation of Delaware Application September 7, 1955, Serial No. 532,932

2 Claims. (Cl. 343—18)

The present invention relates to an arrangement in radar stations to avoid hostile disturbances. The device may also be used for disturbing hostile radar stations.

In order to disturb the reception of signals at radar stations a noise-modulated carrier wave is transmitted which may be varied as to frequency within the radar band concerned. Furthermore it is possible to transmit an unmodulated or a pulse modulated carrier wave, which is also varied within the said band.

The object of the invention is to eliminate the possibilities of disturbing a radar station in the manner mentioned above. The transmitting and receiving portions of the radar station are arranged to change their frequency (sweep) within a certain frequency band used by the station. The device is substantially characterized in that it contains means for detecting gaps in the disturbing signals, if any, within the said frequency band, and for making the radar station transmit a signal, in the interval of the detected gap.

Figure 1:
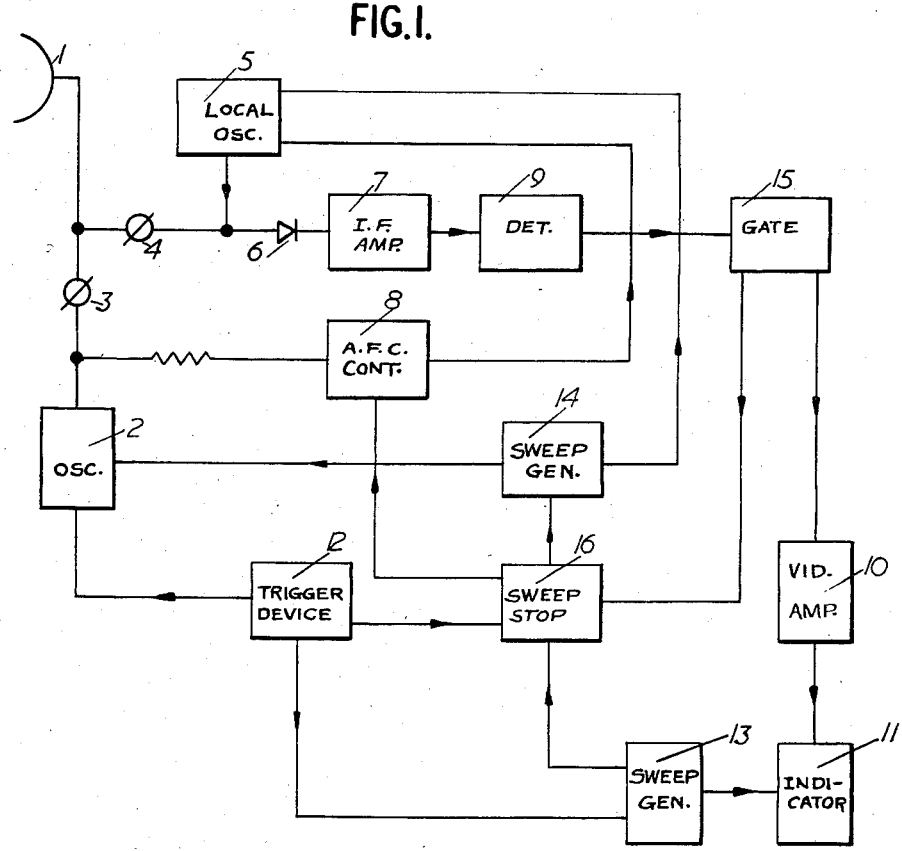
Figure 2:
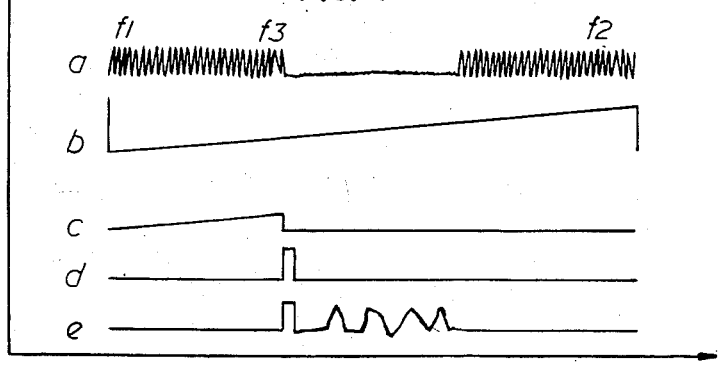

The device according to the invention will be hereinafter described with reference to the accompanying drawing in which Fig. 1 illustrates in block diagram a radar station and Fig. 2 illustrates diagrams of certain pulses appearing in the work of such a station.

Referring to the drawing 1 designates an antenna for transmitting and receiving radar signals. The high frequency part of the radar station is equipped with a transmitter oscillator 2 which generates the carrier frequency in radar pulses, and a local oscillator 5. The oscillator 2 and the receiver 5—6—7 are connected to the antenna 1 over blocking devices (ATR and TR) designated by 3 and 4 respectively, which prevent signals received by the antenna from reaching the transmitter 2 or from transmitting signals from reaching the receiver. The receiver contains a mixer 6 which mixes incoming high frequency with the frequency generated by the local oscillator 5. The intermediate frequency thus formed is supplied to an intermediate frequency amplifier 7. To the output from the transmitter oscillator 2 an automatic frequency control means 8 is connected the function of which is to adjust exactly the oscillator 5 to a frequency differing from the frequency of oscillator 2 by the desired intermediate frequency. The intermediate frequency is applied to a detector 9 which demodulates it to derive the output video signals. The demodulated signal is applied to a video amplifier 10 from which the signal is applied to the radar indicator device 11. Reference numeral 12 designates a trigger device which determines the pulse repetition frequency of the transmitter 2. Reference numeral 13 designates a time base generator which generates the linear sweep of the radar indicator and is synchronized by the trigger device 12.

The system described above is a normal radar station. The station built in accordance with the invention is equipped with additional members which will be described below.

Reference numeral 14 designates a sweep generator which generates a voltage increasing linearly in time with a certain repetition frequency. This voltage is applied to the transmitter oscillator 2 and the local oscillator 5 to vary their frequencies simultaneously. A gate device 15 is connected to the detector outlet and is arranged to detect gaps within the received, disturbing frequency band. Such a gate device contains an integrating rectifier and a multiar and is described in MIT Radiation Laboratory Series, volume 19, page 343. The integrating circuit may be so connected as to apply a positive voltage to the cathode of the multiar thus maintaining this circuit in cut off condition. When a gap occurs in the jamming signal, the cathode of this rectifier will be lowered into ground potential so that the rectifier could produce an output pulse. The gating circuit 15 also may contain a connection so that the entire output of detector 9 is continuously applied to video amplifier 10. However, since the sweep circuit is not affected while jamming signals are being received, there will be no display of these signals on the indicator 11. When such a gap is found, the device 15 transmits a pulse to sweep stop device 16 which in turn stops the sweeping operation of the sweep generator 14 halting the frequency variation of oscillators 2 and 5. The device 16 also actuates the trigger device 12, so that the latter is started when the sweeping operation is stopped and pulses are transmitted from oscillator 2. The sweep stop device is also connected to the automatic frequency control device 8, which is also started into operation.

Fig. 2 indicates voltage time diagram for different voltages appearing at the radar station. The upper curve $a$ shows the incoming high frequency noise modulated voltage. The frequencies indicated, $f1$ and $f2$, designate the limits of the radar band concerned. As can be seen from the figure there is a gap between two portions of this band at frequency $f3$. The curve $b$ illustrates the sweep voltage generated by the generator 14 which controls the local oscillator 5 and the transmitter oscillator 2. The curve $c$ indicates the appearance of the sweep voltage, after the sweep has been stopped at the frequency $f3$, when the gate device has found the gap in the curve $a$. The curve $d$ indicates the trigger pulse transmitted from the trigger generator 12, which pulse starts the time base generator 13 and the transmitter modulator of the member 2. The curve $e$ shows the radar signals received.

The device described functions in the following way: The signal received by the radar station, which may have the appearance indicated in Fig. 2$a$, is received by the antenna 1 and is mixed with the output frequency of the local oscillator 5 in the mixer 6, is amplified in the intermediate frequency amplifier 7, and is demodulated in the detector 9, from where it is supplied to the gate device 15. The latter device finds the gap located between the disturbed portions in the curve $a$ and transmits at the lower limit $f3$ of this gap a signal to the sweep stop device 16. The detected signals also may reach indicator 11, but since the time base generator 13 is not operating, will not show up on the indicator screen. Output from device 16 serves to stop sweep generator 14, and interrupts the sweeping operation at $f3$ in the curve $c$, so that the sweep voltage, which normally has the appearance shown in the curve $b$, will have the appearance shown in the curve $c$. Simultaneously the trigger device 12 is actuated from the sweep stop device 16 and starts the transmitter modulator, so that a high frequency pulse is transmitted over the antenna 1 of the station at the frequency indicated by the gap shown in the curve $a$, at which no disturbances are present. The echo from the transmitted pulse is thereafter received by the antenna 1 and is supplied to the receiver. The signal received of the appearance shown in curve $e$ in Fig. 2 will pass the gate device 15 and is amplified in the video amplifier 10 and is supplied to the indicator 11.

When the trigger device 12 starts the transmitter 2, it will simultaneously start the time base generator 13, which generates the linear time base sweep necessary for the radar indicator. When the time base sweep is over, the time base generator transmits a pulse to the sweep stop device 16 which then again starts the sweep generator.

At the same time as the sweep stop device transmits a start pulse to the trigger device 12, it also transmits a start pulse to the automatic frequency control device 8, which in turn adjusts minutely the local oscillator 5. The automatic frequency control device is so formed that it operates for a period coincident with sweep period for the radar indicator 11.

The pulse frequency of the radar station described is substantially determined by the repetition frequency of the sweep generator.

It can be seen from the above that the device according to the invention acts in such a manner that it is possible to utilize in a radar station gaps in the enemy jamming signal, if any, for transmitting and receiving radar signals. Thus the radar signal will not be disturbed by the enemy jamming signals as would a radar station of conventional form.

The device described can be modified in different ways within the scope of the invention. Thus, the sweep stop device 16 may be immobile during the time when the time base generator operates, so that the former does not need any start pulse from the said generator.

What is claimed is:

1. A radar station comprising a transmitter and a receiver, means to change the frequency of the transmitter and receiver continuously and simultaneously over a predetermined frequency band, means for receiving and detecting signals in said band during said frequency changing, means for detecting gaps during said reception in which no signals are present, and means responsive to detection of such a gap to cause transmission of a radar signal from said transmitter.

2. An arrangement according to claim 1, wherein said transmitter comprises an oscillator and said receiver a local oscillator and wherein said means to change the frequency comprises a sweep generator, coupled to said transmitter oscillator and to said local oscillator, and wherein said means for detecting gaps includes means to interrupt the frequency sweeping of the said oscillators.

References Cited in the file of this patent

UNITED STATES PATENTS

| | | |
|---|---|---|
| 2,532,589 | Wu | Dec. 5, 1950 |
| 2,543,042 | Miller | Feb. 27, 1951 |